May 7, 1946.　　　　　G. STONER　　　　2,399,835
BRAKE LATCH
Filed April 5, 1945
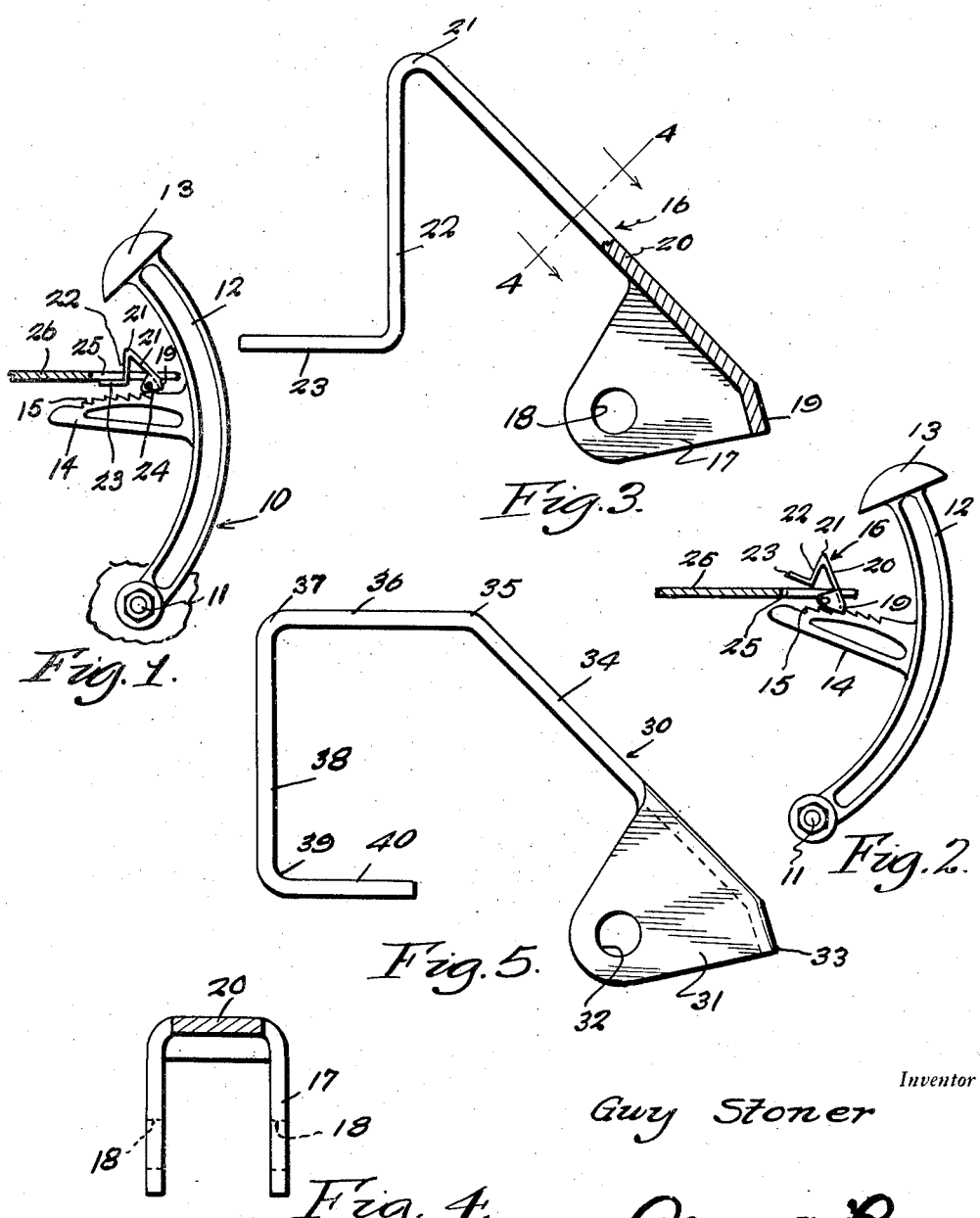
Inventor
Guy Stoner Patented May 7, 1946

2,399,835

UNITED STATES PATENT OFFICE 2,399,835

BRAKE LATCH

Guy Stoner, Fort Dodge, Iowa

Application April 5, 1945, Serial No. 586,686

2 Claims. (Cl. 74—540)

This invention relates to a brake latch, and more particularly to an emergency brake latch adapted for use with tractors or similar vehicles.

A primary object of this invention is the provision of an improved brake latch adapted to be operated by the driver of the vehicle with the heel of the foot, during the time the ball of the foot is engaged with the brake pedal, thus obviating the necessity of removing the hands from the steering wheel in order to set the latch.

A further object of the invention is the provision of an improved latch which is especially convenient when engaging the tractor for belt operation, the operator being able to back the tractor into the belt, set the brake, and lock the improved brake latch of the instant invention without removing his hands from the steering wheel.

A still further object of the invention is the provision of such a brake latch which will be sturdy and durable in construction, reliable and efficient in operation, and relatively simple and inexpensive to manufacture and install.

Other objects will in part be obvious and in part be pointed out as the description of the invention proceeds and shown in the accompanying drawing wherein there is shown a preferred embodiment of this inventive concept.

In the drawing wherein like reference characters refer to like parts throughout the several views of the drawing:

Figure 1 is a side elevational view of one form of latch embodying features of this invention, shown in unlatched position in association with the brake pedal.

Figure 2 is a view similar to Figure 1, but showing the latch in latching position, and the brake pedal compressed.

Figure 3 is a side view partially in elevation and partially in section showing, in enlarged form, the latch disclosed in Figures 1 and 2.

Figure 4 is a sectional view taken substantially along the line 4—4 of Figure 3, and Figure 5 is a side elevational view of a modified form of construction.

Having reference now to the drawing, there is generally indicated at 10 a brake pedal of conventional design, pivoted as at 11 to suitable brake operating mechanism and including a brake lever 12 and a foot pedal 13. The lever 12 is of arcuate configuration and has on its rear surface an extending ratchet member 14 provided with a plurality of notches 15 adapted to engage the latch, generally indicated at 16, comprising a feature of the instant invention.

Having particular reference now to Figure 3 it will be seen that the latch 16 is comprised of a pair of depending brackets 17 having aligned apertures 18 therethrough, adjacent one extremity of which brackets is a latching edge 19, from which an extending portion 20 extends at an angle to an acute bend 21. A portion 22 extends downwardly from the bend 21, to provide a shoulder or heel engaging portion of the latch member, and an extending portion 23 extends rearwardly at right angles from the portion 22.

In the assembly of the device the portions 17 are pivoted as on a pivot 24 in a suitable aperture 25 in a floor plate 26 or the like comprising a portion of the tractor.

When it is desired to set the brake, it will be readily understood that the brake pedal 13 is pushed forwardly by the ball of the foot until such time as it is desired to latch the brake in position, whereupon the heel is moved downwardly to engage the shoulder formed by the portion 22, to tilt the latch portion 19 into engagement with an appropriate notch 15. Pressure of the brake rearwardly securely holds the latch in position, until such time as the portion 23 is depressed by pressure of the foot thereon to release the latch and permit the brake to unlock.

A modified form of construction is disclosed in Figure 5 wherein the latch member generally indicated as 30 includes two depending portions 31, provided with aligned apertures 32 through which a pivot pin is adapted to pass, similar to the pivot pin 24, a latching surface 33 and a portion extending upwardly at an angle thereto 34, corresponding to the portion 20. The portion 34 terminates in a bend 35 forming an obtuse angle, from which extends a portion 36 terminating in a right angle 37 having a depending portion 38 terminating in a second right angle 39, from which a member 40 extends inwardly in parallelism to the portion 36.

In this modification the right angled bend 37 and the portion 38 form the shoulder adapted to be struck by the heel, corresponding to the bend 21 and the portion 22 of the previous modification, and when it is desired to release the brake the heel or foot may be brought down on the portion 36, which acts in the manner corresponding to the portion 23.

From the foregoing it will now be seen that there is herein provided an improved brake latch accomplishing all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a device of the character described, a latch member including a latching face, a portion extending at an obtuse angle to said face, depending lugs having apertures therein adapted for the reception of a pivot, a bend at the extremity of said portion forming a heel engaging abutment, and a second portion extending from said bend, said heel engaging bend comprising an acute angle.

2. In a device of the character described, a latch member including a latching face, a portion extending at an obtuse angle to said face, depending lugs having apertures therein adapted for the reception of a pivot, a bend at the extremity of said portion forming a heel engaging abutment, a second portion extending from said bend, said heel engaging bend comprising an acute angle, and a third portion extending at right angles to said second portion adapted to be struck to release said latch.

GUY STONER.